(12) United States Patent
Delatorre (10) Patent No.: US 9,037,108 B1
(45) Date of Patent: May 19, 2015

(54) EMERGENCY ASSISTANCE FOR MOBILE COMMUNICATION DEVICE USER

(75) Inventor: Renato Delatorre, Palisades Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 678 days.

(21) Appl. No.: 12/630,248

(22) Filed: Dec. 3, 2009

(51) Int. Cl.
H04M 11/04 (2006.01)
H04W 4/22 (2009.01)

(52) U.S. Cl.
CPC .................................... *H04W 4/22* (2013.01)

(58) Field of Classification Search
CPC ....... H04W 4/22; H04W 4/02; H04W 76/007; H04M 11/04; H04L 67/18
USPC ............................................ 455/404.1, 404.2
See application file for complete search history.

(56) References Cited

U.S. PATENT DOCUMENTS

| | | | | |
|---|---|---|---|---|
| 2002/0118796 | A1* | 8/2002 | Menard et al. | 379/45 |
| 2005/0151642 | A1* | 7/2005 | Tupler et al. | 340/539.18 |
| 2006/0136972 | A1* | 6/2006 | Metzger et al. | 725/105 |
| 2010/0262668 | A1* | 10/2010 | Piett et al. | 709/206 |

OTHER PUBLICATIONS

Wallace Wireless Inc., Blackberry WIC Alerter, obtained Oct. 14, 2009, from http://appworld.blackberry.com/webstore/content/3549.
Mac Jadalhack, "WIC Panic Button for BlackBerry," PocketBerry. com, May 12, 2009 http://www.pocketberry.com/2009/05/12/wic-panic-button-for-blackberry/, reprinted Dec. 3, 2009.
Wallace Wireless Inc., "WIC Panic Button," BlackBerry App World—WIC Panic Button, Apr. 24, 2009 http://appworld.blackberry.com/webstore/content/945, reprinted Sep. 24, 2009.

* cited by examiner

*Primary Examiner* — Omoniyi Obayanju (57) ABSTRACT

An automated emergency assistance computing system may be configured to receive and store registration information about a mobile communication device user that may need help in connection with an emergency, including information about the type of the emergency. The system may receive an emergency alert from a mobile communication device through a communication network which indicates that a user of the mobile communication device is experiencing an emergency, including information about the location of the emergency. An emergency help request may be issued for help relating to the emergency. The emergency help request may include information about the location of the emergency, about the type of the emergency, and about how to communicate with the automated emergency assistance computing system to obtain continuous real time information relating to the emergency.

22 Claims, 3 Drawing Sheets

EMERGENCY ASSISTANCE FOR MOBILE COMMUNICATION DEVICE USER

BACKGROUND

1. Technical Field

This disclosure relates to mobile communication devices and to emergencies that may be experienced by users of such devices.

2. Description of Related Art

Mobile communication devices, such as cell phones, may be used to seek help in connection with an emergency. However, the user may need to address the request for help (e.g., by dialing 911) and provide information about the emergency (e.g., reporting the nature and location of the emergency).

A user may not always be able to perform these tasks during an emergency. For example, a user may be too weak to identify and depress several keyboard buttons or to describe the user's predicament. A user may in addition or instead not have the time needed to perform these tasks. This lack of time may be caused by the urgency of the emergency or due to restrictions imposes by circumstances such as an abduction.

Even when a user is able to successfully use the mobile communication device to seek emergency help, the circumstances of the emergency may change. This may alter the nature of the help which is needed, but the user may no longer have the opportunity and/or ability to update her request for help. For example, a user might report an abduction, following which the user might be tied, gagged, and moved to a new location. Similarly, a user might report a fire, following which the user might be injured and unable to report the need for medical attention.

SUMMARY

An automated emergency assistance computing system may receive an emergency alert from a mobile communication device through a communication network which indicates that a user of the mobile communication device is experiencing an emergency. The alert may include information about the location of the emergency. The system may issue an emergency help request for help relating to the emergency. The emergency help request may include information about the location of the emergency and about how to communicate with the automated emergency assistance computing system to obtain continuous real time information relating to the emergency. The system may receive continuous real time information relating to the emergency from the mobile communication device. The system may also receive an emergency information request seeking continuous real time information relating to the emergency. The system may deliver continuous real time information relating to the emergency in response to the emergency information request.

The system may receive and store registration information through the communication network about a mobile communication device user that may need help in connection with an emergency, including information about the type of the emergency. The system may require a form to be completed in connection with receiving the registration information. The form may request information specific to the type of the emergency.

The system may identify emergency personnel suitable for the emergency based on the registered type of the emergency and/or the location of the emergency. The system may issue the emergency help request to the identified emergency personnel.

The emergency help request may be issued in the form of a text message and/or a verbal message.

The emergency help request may indicate that the continuous real time information relating to the emergency may be obtained through a website. The request may include an address of the website. The requested continuous real time information relating to the emergency may be delivered by the website.

The emergency help request may indicate that the continuous real time information relating to the emergency may be obtained through a telephone communication system and may include a phone number to call to obtain the information. The requested continuous real time information relating to the emergency may be delivered by the telephone communication system.

The system may seek an acknowledgement that the emergency help request has been received and repeat the emergency help request if the acknowledgement is not received.

The continuous real time information may include updates to the location of the mobile communication device and/or streaming audio of sound and/or streaming video of images picked up by the mobile communication device.

The system may call or receive a call from the mobile communication device after receiving the emergency alert in order to establish a communication channel over which the continuous real time information is delivered.

In response to the emergency information request, stored continuous real time information relating to the emergency may be delivered.

A mobile communication device may provide emergency assistance, The device may include a user-operated emergency signaling control. In response to operation of the user-operated emergency-signaling control, the device may deliver an emergency alert to an automated emergency assistance computing system indicating that there is an emergency. The alert may include information about the location of the emergency. The device may deliver continuous real time emergency information to the automated emergency assistance computing system relating to the emergency.

The device may deliver registration information to the automated emergency assistance computing system indicating that a user of the mobile communication device may need help in connection with an emergency. The registration information may include information about the type of the emergency.

The device may call or receive a call from the automated emergency assistance computing system after delivering the emergency alert in order to establish a communication channel over which the continuous real time information is delivered by the wireless communication system.

After operation of the user-operated emergency signaling control, the device may deliver the emergency alert and the continuous real time emergency information without further input from a user and/or without causing the device to signal through a user interface that either communication is being delivered.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effec

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
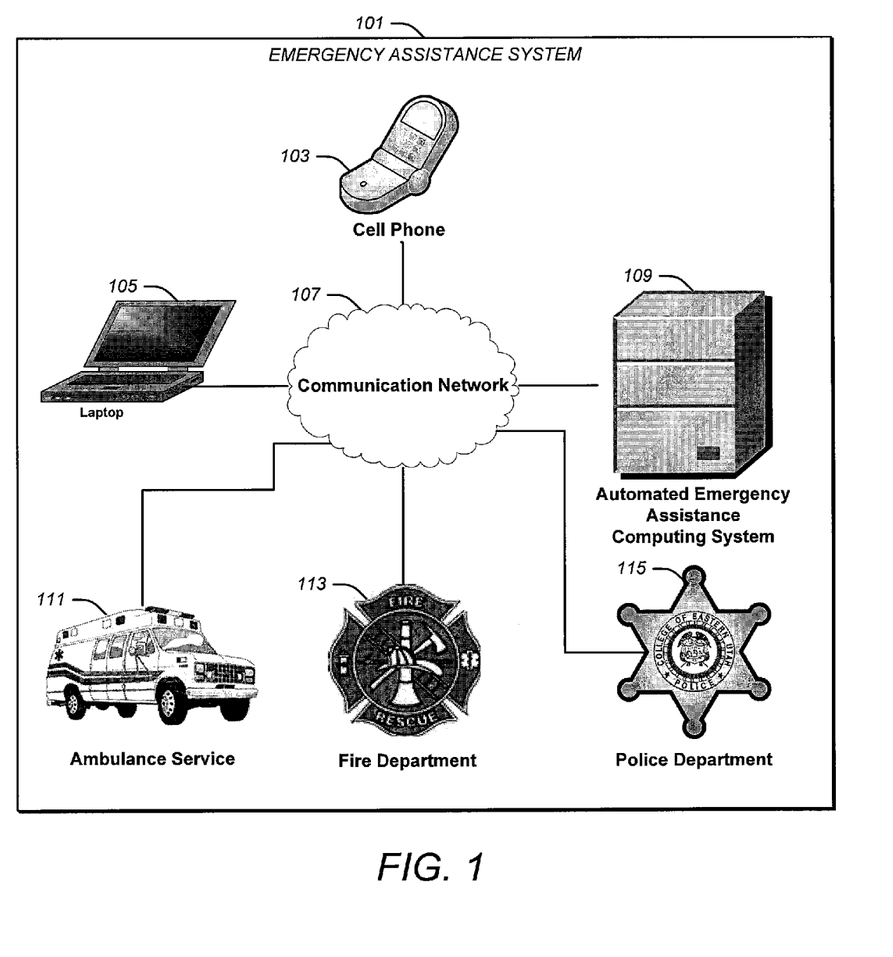
- FIG. 1 illustrates components of an emergency assistance system.

FIG. 1 illustrates components of an emergency assistance system 101.

The emergency assistance system 101 may include one or more mobile communication devices, such as one or more cell phones, laptop computers, netbooks, and/or wearable devices, such as watches or devices which are embedded in other mobile devices, such as car radios. FIG. 1 illustrated two such mobile communication devices, a cell phone 103 and a laptop 105.

The emergency assistance system may include a communication network 107, an automated emergency assistance computing system 109, and one or more emergency services, such as an ambulance service 111, a fire department 113, and/or a police department 115.

The communication network 107 may be of any type or types. For example, the communication network 107 may include the internet, one or more local area networks, one or more wide area networks, and/or the public switched telephone network.

The automated emergency assistance computing system 109 may be configured to provide automated emergency assistance. The automated emergency assistance computing system 109 may include one or more servers connected to the internet, one or more local area networks, one or more wide area networks, and/or the public switched telephone network.

Figure 2:
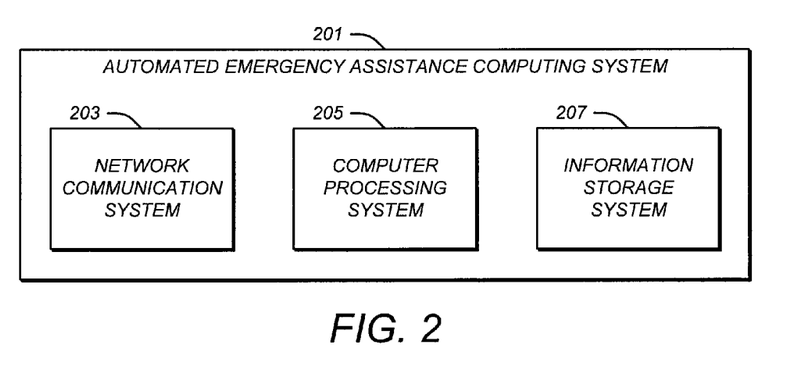
FIG. 2 illustrates an automated emergency assistance computing system that may be used in an emergency assistance system.

FIG. 2 illustrates an automated emergency assistance computing system 201 that may be used in an emergency assistance system. The automated emergency assistance computing system 201 may be used as the automated emergency assistance computing system 109 illustrated in FIG. 1 or in any other type of emergency assistance system. The automated emergency assistance computing system 109 may be different from the automated emergency assistance computing system 201.

As illustrated in FIG. 2, the automated emergency assistance computing system 201 may include a network communication system 203, a computer processing system 205, and/or an information storage system 207.

The network communication system 203 may be configured to communicate with any type of communication network, such as the communication network 107. For example, the network communication system 203 may be configured to communicate with the internet, one or more local area networks, one or more wide area networks, and/or the public switched telephone network. The network communication system 203 may include a telephone communication system and/or a website. The network communication system 203 may be at a single location or may be distributed across multiple locations.

The information storage system 207 may be configured to controllably receive, store, and output information, such as registration information and/or continuous real time information, as described below. The information storage system 207 may include one or more memory devices, such as one or more RAMS, ROMS, PROMS, ePROMS, flash memories, CD's, DVD's, and/or hard disk drives. The information storage system 207 may be at a single location or may be distributed across multiple locations.

The computer processing system 205 may be configured to perform the functions of the computer processing system 205 which are described below. The computer processing system 205 may include computer hardware and software. The computer hardware may include one or more processors and related processing devices. The computer software may include one or more algorithms configured to perform the functions of the computer processing system 205 which are described below. The computer software may be stored on computer-readable storage media, such as on one or more hard disc drives, DVD's, CD's, flash memories, ROMS, PROMS, and/or ePROMS. During use, the computer software may be moved to RAM.

The network communication system 203 and the computer processing system 205 may be configured to receive registration information through a communication network, such as the communication network 107. The registration information may include information about a user of a mobile communication device, such as the cell phone 103 or the laptop 105, that may need help in connection with an emergency.

The registration information may include information identifying the mobile communication device and/or one or more users of the mobile communication device which may issue an emergency alert relating to the emergency which is the subject of the registration information. The registration information may include information about the type of the emergency. For example, the type of the emergency may be a potential violation of a court-issued, stay-away order, an attack, an abduction, a fire, or a medical emergency. The registration information may include information about multiple types of emergencies.

The registration information may be received in any form and through any type of communication channel. For example, the registration information may be received through the public switched telephone network and/or a webpage.

The computer processing system 205 may ask a series of questions relating to the type of the emergency which is identified. When using a telephone interface, these questions may be asked verbally. When using a website, these questions may be presented as part of a fill-in form.

The questions may vary depending upon the type of the emergency. For example, when the type of emergency is a violation of a court-issued, stay-away order, the computer processing system 205 may ask for the name of the individual who was ordered to stay away, the court which issued the order, the date of the order, information about prior violations or threatened violations of the order, and/or any other types of information. When the type of emergency is a medical emergency, the computer processing system 205 may seek information about the current medical condition of the user, about prior medical emergencies which the user has experienced, the name and phone number of the user's physician, insurance information, and/or other types of information.

The computer processing system may cause the registration information to be stored in the information storage system 207.

The network communication system 203 and the computer processing system 205 may receive an emergency alert from a mobile communication device through a communication network, such as the communication network 107. The emergency alert may indicate that a user of the mobile communication device is experiencing an emergency. The emergency alert may include information identifying the mobile communication device which issued the emergency alert, the user of that mobile communication device, the location of the emergency, and/or the type of the emergency.

The emergency alert may be communicated over any type of communication channel, such as the Internet, one or more local area networks, one or more wide area networks, and/or the public switched telephone network.

The computer processing system 205 may cause the information about the emergency alert to be stored in the information storage system 207.

In response to receiving an emergency alert, the computer processing system 205 may identify emergency personnel suitable for the emergency which is the subject of the emergency alert. The computer processing system 205 may do so based on the type of the emergency, the location of the emergency, and/or other criteria.

The computer processing system 205 may search information in the information storage system 207 to find registration information about the mobile communication device which issued the alert and/or about one or more users of that mobile communication device. Upon finding a match, the computer processing system 205 may extract the registered type of the alert from the information storage system 207. The computer processing system 205 may in addition or instead obtain the type of the alert from the emergency alert itself.

The computer processing system 205 may use the type of the alert for the purpose of identifying suitable emergency personnel. For example, if the type of the alert is a potential fire, the computer processing system 205 may identify a fire department as the suitable emergency personnel. If the type of the alert is an attack, the computer processing system 205 may identify a police department as the suitable emergency personnel. If the registered type of the alert is an attack, the computer processing system may identify an ambulance service and/or a police department as the suitable emergency personnel.

As indicated, the computer processing system 205 may in addition or instead identify suitable emergency personnel based on the location of the emergency, as specified in the emergency alert. For example, the computer processing system 205 may seek to identify the emergency personnel whom are closest to the location of the emergency. To facilitate such an identification, the computer processing system 205 may cause the network communication system 203 to communicate through a communication network, such as the communication network 107, with an emergency location service, such as e911.

The network communication system 203 and the computer processing system 205 may issue an emergency help request through a communication network, such as the communication network 107. The emergency help request may request help in connection with the emergency which is the subject of the emergency alert. The emergency help request may include information identifying the mobile communication device which issued the emergency alert, a user of that device, the type of the emergency, and/or the location of the emergency. The emergency help request may include information about how to communicate with the automated emergency assistance computing system 201 to obtain continuous real-time information relating to the emergency and/or any other type of information.

The way in which the emergency help request specifies how to communicate with the automated emergency assistance computing system 201 to obtain continuous real-time information may depend upon the communication channel which the automated emergency assistance computing system 201 has for communicating this continuous real-time information. For example, the emergency help request may indicate that the continuous real-time information may be obtained at a website, in which case a URL address of the website may be supplied as part of the emergency help request. The emergency help request may in addition or instead indicate that the continuous real-time information may be obtained over the telephone, in which case the emergency help request may include a phone number to call.

The emergency help request may be in any form. For example, it may be a text message delivered through a text messaging system. It may in addition or instead be in the form of a verbal message. The verbal message may be delivered through a telephone system, as streaming media over the internet, as a multimedia file attached to a message, and/or in any other way.

The computer processing system 205 may seek an acknowledgment that the emergency help request has been received. If the acknowledgment is not forthcoming, the computer processing system 205 may repeat the emergency help request periodically until such an acknowledgment is received.

The network communication system 203 and the computer processing system 205 may receive continuous real-time information relating to the emergency from the mobile communication device which issued the emergency alert through a communication network, such as the communication network 107. This real time information may begin to be received either before, after, or at the same time as the emergency alert.

The continuous real-time information may be received by the network communication system 203 over a communication channel of the same type that was used to deliver the emergency alert. In other configurations, the communication channel which is used to deliver the continuous real-time information relating to the emergency may be different than the channel used to deliver the emergency alert. For example, the emergency alert may use a text messaging channel, while the continuous real-time information may use a telephone voice channel. To facilitate the use of a telephone voice channel, the network communication system 203 and the computer processing system 205 may issue a call to or may receive a call from the mobile communication device which issued the emergency alert. The continuous real-time information may then be sent over this telephone voice channel after this call is answered.

The continuous real-time information may be of any type or types. For example, the continuous real-time information may include updates to the location of the mobile communication device which issued the emergency alert. These updates may be periodic or may be issued based on changes in this location, including the speed at which these changes occur. The continuous real-time information may in addition or instead include streaming audio of sound and/or streaming video of images picked up by the mobile communication device. The computer processing system 205 may cause the continuous real-time information relating to the emergency to be stored in the information storage system 207.

The network communication system 203 and the computer processing system 205 may receive an emergency information request from a communication network, such as the communication network 107, seeking continuous real-time information relating to the emergency. Such a request, for example, may come from the emergency personnel which received an emergency help request. Such a request may be communicated to the network communication system 203 through any means. For example, such a request may be communicated over the telephone using the telephone number provided in the emergency help request. The request may in addition or instead be communicate through a webpage at the URL provided in the emergency help request.

The emergency information request may specify the type of emergency information which is desired. For example, the emergency information request may specify that continuous real-time information relating to the emergency is desired. The requested continuous real-time information may include updates to the location of the mobile communication device and/or streaming audio of sound and/or streaming video of images which are being picked up by the mobile communication device. The requested continuous real-time information may include previously-recorded segments of location updates and/or audio and/or video streams that are stored in the information storage system 207. The emergency request may in addition or instead request all or any portion of the registration information which was originally provided in connection with the emergency.

The network communication system 203 and the computer processing system 205 may deliver the continuous real-time information which is requested by the emergency information request through a communication network, such as the communication network 107. The delivery may be to the emergency personnel to whom the emergency help request was delivered and/or to any other person, agency, and/or organization. The delivery may be over the same channel as the emergency information request and/or over a different channel.

Figure 3:
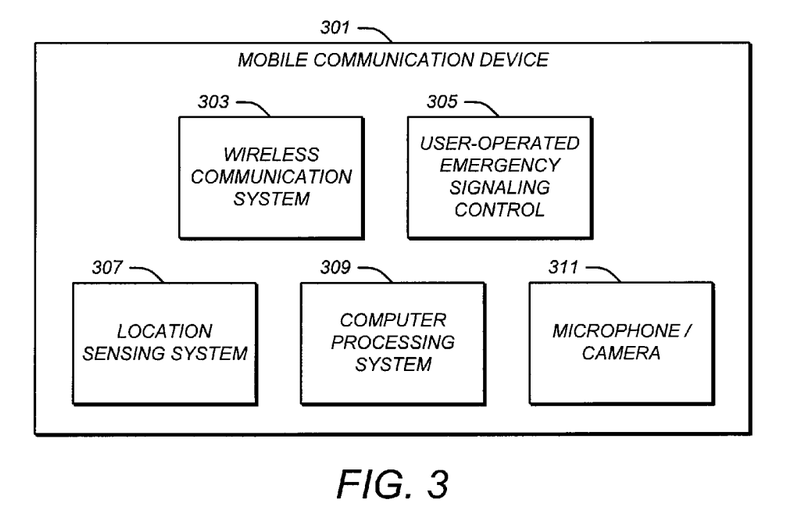
FIG. 3 illustrates a mobile communication device that may be used in an emergency assistance system.

FIG. 3 illustrates a mobile communication device 301 that may be used in an emergency assistance system.

The mobile communication device 301 may be any of the types of mobile communication devices that were discussed above in connection with FIG. 1, such as the cell phone 103 or the laptop 105. The mobile communication device 301 may be used in an emergency assistance system of the type illustrated in FIG. 1 or in a different type of emergency assistance system. Similarly, the mobile communication devices which are used in the emergency assistance system 101 illustrated in FIG. 1 may be of a different type than the mobile communication device 301.

The mobile communication device 301 may include a wireless communication system 303, a user-operated emergency signaling control 305, a location sensing system 307, a computer processing system 309, and a microphone and/or camera 311.

The wireless communication system 303 may be configured to communicate wirelessly with a communication network, such as the communication network 107. The wireless communication system 303 may be of any type. For example, the wireless communication system 303 may include a transmitter and a receiver and an associated signal processing devices and systems.

The user-operated emergency signaling control 305 may be configured to signal an emergency when operated by a user of the mobile communication device 301. The user-operated emergency signaling control 305 may be of any type. For example, it may be a mechanical button or switch and/or an area on a touch screen. It may in addition or instead be a sound transducer and an associated signal processing system configured to receive a sound indicative of an emergency, such as a scream, explosion, and/or an utterance of language indicating an emergency, such as "emergency" and/or "help." When multiple types of emergencies may be signaled, a different user-operated signaling control may be provided for each type. The mobile communication device 301 may be configured to allow a user of the mobile communication device 301 to specify which user-operated control on the mobile communication device is to function as the user-operated emergency signaling control 305.

The location sensing system 307 may be configured to sense the location of the wireless mobile communication device 301. The location sensing system 307 may include any type of device or devices to accomplish this purpose. For example, the location sensing system 307 may include a GPS receiver, triangulation technology, and/or an accelerometer. The location sensing system 307 may be configured to sense the location of the mobile communication device 301 on earth or within a smaller geographic area. The location sensing system 307 may be configured to express the sensed location in any form, such as in the form of a longitude, latitude, and/or altitude specification.

The computer processing system 309 may be configured to perform the functions of the computer processing system 309 which are described below. The computer processing system 309 may include computer hardware and software. The computer hardware may include one or more processors and related processing devices. The computer software may include one or more algorithms configured to perform the functions of the computer processing system 309 which are described below. The computer software may be stored on computer-readable storage media, such as on one or more hard disc drives, DVD's, CD's, flash memories, ROMS, PROMS, and/or ePROMS. During use, the computer software may be moved to RAM.

The computer processing system 309 may enable the user of the mobile communication device 301 to deliver registration information of any of the types discussed above to an automated emergency assistance computing system, such as the automated emergency assistance computing system 201, through a communication network, such as the communication network 107. When the automated emergency assistance computing system presents a form that is to be completed in connection with the delivery of registration information, the computer processing system 309 may cause that form to be displayed on a user interface that is part of the mobile communication device 301 and to allow the user to operate the mobile communication device 301 to fill in the entries on this form.

The computer processing system 309 may cause the user-operated emergency signaling control 305 to be armed at all times or only upon request of a user of the mobile communication device 301. Such a request may be communicated by the user through a user interface (not shown) in the mobile communication device 301.

The computer processing system 309 may be configured to receive information indicating when the user-operated emergency signaling control 305 has been operated. In response to operation of this control, the computer processing system 309 may cause the wireless communication system 303 to deliver an emergency alert to an automated emergency assistance computing system, such as the automated emergency assistance computing system 109, through a communication network, such as the communication network 107. The emergency alert may be any of the types of emergency alerts discussed above.

Either before, after, or during the issuance of the emergency alert, the computer processing system 309 may be configured to deliver continuous real-time emergency information to the automated emergency assistance computing system through the communication network relating to the emergency. This continuous real-time information may include updates to the location of the mobile communication device 301, as provided by the location sensing system 307, and/or streaming audio of sound and/or streaming video of images, as picked up by the microphone/camera 311.

The wireless communication system 303 may be configured to deliver the emergency alert over a communication channel which is the same or different than the communication channel over which the continuous real-time information is delivered. For example, the wireless communication system 303 may be configured to deliver the emergency alert over a voice channel and/or a data channel. The wireless communication system 303 and the computer processing system 309 may be configured to cause the mobile communication device 301 to call or to receive a call from the automated emergency assistance computing system in order to initiate a communication channel for the continuous real-time information.

The computer processing system 309 may be configured to cause the wireless communication system to deliver the emergency alert and the continuous real-time information without further input from a user after operation of the user-operated emergency signaling control 305. Similarly, the computer processing system 309 may be configured to cause the wireless communication system 303 to deliver the emergency alert and/or the continuous real-time emergency information without causing the mobile communication device 301 to signal through a user interface that either communication is being delivered.

Figure 4:
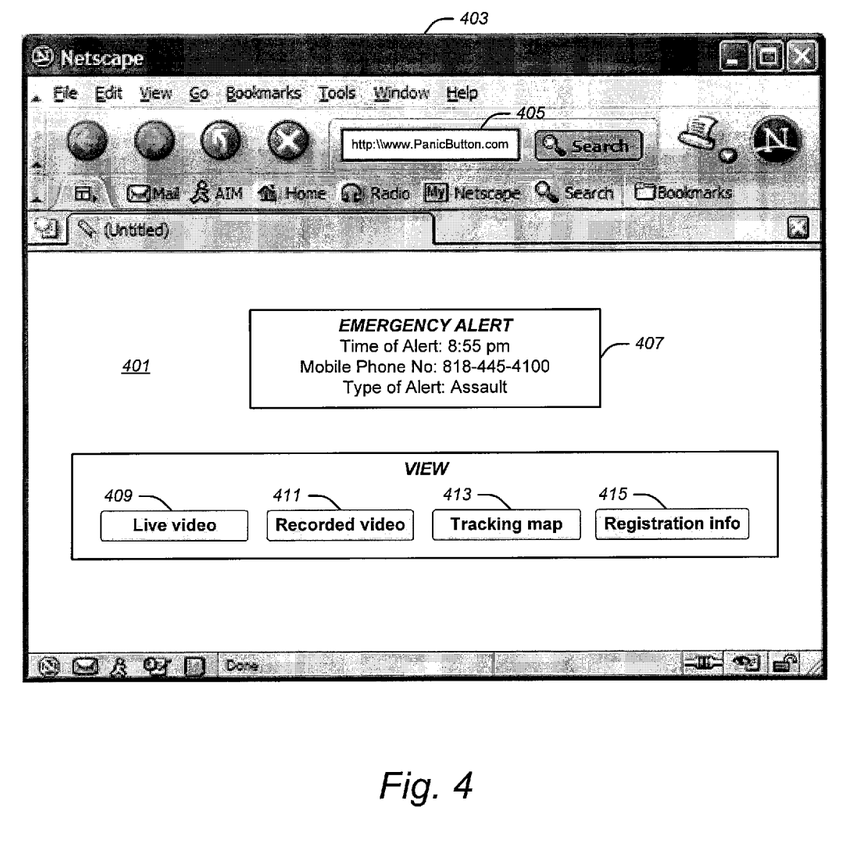
FIG. 4 illustrate a webpage at which continuous real time information relating to an emergency may be obtained.

FIG. 4 illustrate a webpage 401 at which continuous real time information relating to an emergency may be obtained. Such a webpage may be used in connection with the automated emergency assistance computing systems 109 and/or 201 discussed above or in connection with a different one. Similarly, a different webpage may be used in connection with these automated emergency assistance computing systems.

As illustrated in FIG. 4, the webpage 401 may appear within a client browser window 403. The webpage 401 may be delivered when a recipient of an emergency help request seeks continuous real-time information relating to the emergency. The recipient or other person may obtain this webpage by communicating with the automated emergency assistance computing system which issued the emergency help request using the URL address 405 provided in the emergency help request.

Any information may be provided on the webpage 401 and/or on other webpages which may be linked to it. This information may be provided in any format. FIG. 4 is purely illustrative.

As illustrated in FIG. 4, basic information about the emergency 407 may be provided on the webpage 401. The webpage 401 may also provide options for viewing continuous real-time information relating to the emergency, such as a live video button 409, a recorded video button 411, a tracking map button 413, and a registration information button 415. Other types of user-operated controls may be provided in addition or instead.

Clicking the live video button 409 may cause a live video which is being captured by the mobile communication device to be displayed. The video may include images and/or sound. Clicking the recorded video button 411, on the other hand, may cause continuous real-time information relating to the emergency which had been recorded in an information storage system, such as the information storage system 207, to be played back. A Live audio or Recorded audio button may be provided in addition or instead and may function in the same way, except that only audio may be provided.

Clicking on the tracking map button 413 may cause a map of the area in which the emergency is taking place to be displayed. The map may include a trail tracking locations at which the mobile communication device has been. The trail may track locations both before and after issuance of the emergency alert. The trail may mark the location at which the alert was issued.

Clicking the registration information button 415 may cause all or portions of any registration information which was provided to be displayed.

The webpage 401 may include a button or other type of user control which, when actuated, may enable emergency personnel to communicate directly with the user who issued the emergency alert. For example, actuation of such a user control may facilitate voice communication between the user and the emergency personnel. This voice communication may or may not be channeled through the automated emergency assistance computing system.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. An automated emergency assistance computing system comprising: an information storage system configured to controllably receive, store, and output information; and a computer processing system and a network communication system configured to: receive registration information from a mobile communication device, prior to an emergency, the registration information being related to different types of emergencies, including a first type of emergency and a second type of emergency, that are to be registered and associated with a mobile communication device user who may need help in connection with at least one of the types of registered emergencies, the registration information including information identifying the first and second types of emergencies and, for the identified first and second types of emergencies respective first and second user-operated signaling controls of the mobile communication device to be used on occurrences of the respective identified first and second types of registered emergencies; cause the information storage system to store the registration information prior to an occurrence of any of the types of registered emergencies; receive a first emergency alert from the mobile communication device through a communication network indicating that the user of the mobile communication device is encountering the first type of registered emergency, including information about a first location of the encountered first type of registered emergency, responsive to receiving a first input indicating operation of the respective first user-operated signaling control and, wherein the first location information is received from a location sensing system of the mobile communication device; receive a second emergency alert from the mobile communication device through the communication network indicating that the user of the mobile communication device is encountering the second type of registered emergency, responsive to receiving a second input indicating operation of the second user-operated signaling control; identify respective emergency response personnel suitable for the first and second types of registered emergencies based on the registration information; issue respective emergency help requests to the respective identified emergency personnel through the communication network for help relating to the first type of registered emergency and the second type of registered emergency, the respective issued emergency help requests indicating the respective first and second types of registered emergencies; and cause the mobile communication device to deliver continuous real time emergency information related to the second type of registered emergency to the respective identified emergency response personnel through the communication network, without receiving any further input from the mobile communication device, after receiving the second input indicating operation of the second user-operated signaling control.

2. The automated emergency assistance computing system of claim 1 wherein the computer processing system is configured to require a form to be completed by the user of the mobile communication device in connection with the receiving of the registration information which requests information specific to the different types of emergencies.

3. The automated emergency assistance computing system of claim 1 wherein:
the computer processing system is further configured to identify emergency personnel suitable for the one type of registered emergency based on the location of the emergency.

4. The automated emergency assistance computing system of claim 1 wherein the computer processing system is configured to issue the emergency help request in the form of a text message.

5. The automated emergency assistance computing system of claim 1 wherein the computer processing system is configured to issue the emergency help request in the form of a verbal message.

6. The automated emergency assistance computing system of claim 1 wherein:
the emergency help request includes information about the location of the emergency and about how to communicate with the automated emergency assistance computing system to obtain the continuous real time information relating to the one type of emergency; and
the computer processing system and network communication system is further configured to:
receive the continuous real time information relating to the one type of registered emergency from the mobile communication device through the communication network;
receive an emergency information request through the communication network seeking the continuous real time information relating to the one type of registered emergency; and
deliver, through the communication network, the continuous real time information relating to the one type of registered emergency in response to the emergency information request.

7. The automated emergency assistance computing system of claim 6 wherein:
the network communication system includes a website;
the emergency help request indicates that the continuous real time information relating to the one type of registered emergency may be obtained through the website and includes an address of the website; and
the requested continuous real time information relating to the one type of registered emergency is delivered by the website.

8. The automated emergency assistance computing system of claim 6 wherein:
the network communication system includes a telephone communication system;
the emergency help request indicates that the continuous real time information relating to the one type of registered emergency may be obtained through the telephone communication system and includes a phone number to call to obtain the information; and
the requested continuous real time information relating to the one type of registered emergency is delivered by the telephone communication system.

9. The automated emergency assistance computing system of claim 6 wherein the continuous real time information includes updates to the location of the mobile communication device.

10. The automated emergency assistance computing system of claim 6 wherein the continuous real time information includes streaming audio of sound picked up by the mobile communication device.

11. The automated emergency assistance computing system of claim 6 wherein the real time information includes streaming video of images picked up by the mobile communication device.

12. The automated emergency assistance computing system of claim 1 wherein the computer processing system is configured to call the mobile communication device after receiving the emergency alert in order to establish a communication channel over which the continuous real time information is delivered.

13. The automated emergency assistance computing system of claim 1 wherein the computer processing system is configured to receive a call from the mobile communication device after receiving the emergency alert in order to establish the communication channel over which the continuous real time information is delivered.

14. The automated emergency assistance computing system of claim 6 wherein the computer processing system is configured to:
   cause the continuous real time information relating to the one type of registered emergency to be stored in the information storage system;
   in response to the emergency information request:
      cause the information storage system to output the stored continuous real time information relating to the one type of registered emergency; and
      cause the outputted stored continuous real time information relating to the one type of registered emergency to be delivered through the communication system.

15. The automated emergency assistance computing system of claim 1 wherein the computer processing system is configured to seek an acknowledgement that the emergency help request has been received and to repeat the emergency help request if the acknowledgement is not received.

16. A mobile communication device which provides emergency assistance comprising:
   a wireless communication system configured to communicate wirelessly with a communication network;
   a user-operated emergency signaling control;
   a location sensing system configured to sense the location of the wireless communication device;
   a computer processing system configured to:
      deliver registration information, prior to an emergency, to an automated emergency assistance computing system through the communication network indicating that a user of the mobile communication device may need help in connection with an emergency, the registration information including information about first and second types of emergencies including assignment of first and second different user operated signaling controls to the respective first and second types of emergencies;
      receive information indicating operation of the first user-operated emergency signaling control indicating that the first type of emergency has occurred and of the second user-operated emergency signaling control indicating that the second type of emergency has occurred;
      in response to operation of the first user-operated emergency-signaling control:
         cause the wireless communication system to deliver a first emergency alert to the automated emergency assistance computing system through the communication network indicating the first type of emergency encountered by the user of the wireless communication device and information about a location of the first type of emergency; and
         cause the wireless communication system to deliver continuous real time emergency information to the automated emergency assistance computing system through the communication network relating to the first type of emergency, and
      in response to operation of the second user-operated emergency-signaling control:
         cause the wireless communication system to deliver a second emergency alert to an automated emergency assistance computing system through the communication network indicating the second type of emergency encountered by the user of the wireless communication device and information about the location of the second type of emergency; and
         cause the wireless communication system to deliver continuous real time emergency information to the automated emergency assistance computing system through the communication network relating to the second type of emergency,
      wherein the computer processing system is configured to cause the wireless communication system to deliver the emergency alert and the continuous real time emergency information without further input from a user after operation of the first or second user-operated emergency signaling control.

17. The mobile communication device of claim 16 wherein the continuous real time information includes updates to the location of the mobile communication device.

18. The mobile communication device of claim 16 wherein the continuous real time information includes streaming audio of sound picked up by the mobile communication device.

19. The mobile communication device of claim 16 wherein the real time information includes streaming video of images picked up by the mobile communication device.

20. The mobile communication device of claim 16 wherein the computer processing system is configured to cause the wireless communication system to call the automated emergency assistance computing system after delivering the emergency alert in order to establish a communication channel over which the continuous real time information is delivered by the wireless communication system.

21. The mobile communication device of claim 16 wherein the computer processing system is configured to cause the wireless communication system to receive a call from the automated emergency assistance computing system after delivering the emergency alert in order to establish a communication channel over which the continuous real time information is delivered by the wireless communication system.

22. The mobile communication device of claim 16 wherein the computer processing system is configured to cause the cause the wireless communication system to deliver the first emergency alert and the continuous real time emergency information without causing the mobile communication device to signal through a user interface that either communication is being delivered.

* * * * *